(12) United States Patent
Iha

(10) Patent No.: US 9,030,572 B2
(45) Date of Patent: May 12, 2015

(54) APPARATUS, METHOD, AND PROGRAM FOR PROCESSING IMAGE

(71) Applicant: Samsung Techwin Co., Ltd., Changwon (KR)

(72) Inventor: Yasushi Iha, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 14/053,861

(22) Filed: Oct. 15, 2013

(65) Prior Publication Data

US 2014/0152864 A1   Jun. 5, 2014

(30) Foreign Application Priority Data

Dec. 4, 2012   (JP) .................................. 2012-265772
Jun. 18, 2013   (KR) ........................ 10-2013-0069951

(51) Int. Cl.
*H04N 5/228* (2006.01)
*H04N 9/73* (2006.01)
*H04N 5/217* (2011.01)
*H04N 9/04* (2006.01)
*H04N 5/359* (2011.01)

(52) U.S. Cl.
CPC ............ *H04N 9/735* (2013.01); *H04N 5/2175* (2013.01); *H04N 9/045* (2013.01); *H04N 5/359* (2013.01)

(58) Field of Classification Search
USPC ....................................................... 348/222.1
See application file for complete search history.

(56) References Cited

U.S. PATENT DOCUMENTS

| 6,738,520 | B1 | 5/2004 | Acharya et al. |
| 6,819,713 | B1 | 11/2004 | Sato |
| 7,224,843 | B2 | 5/2007 | Jeong |
| 2006/0055985 | A1* | 3/2006 | Ikeda ............................ 358/463 |
| 2007/0279372 | A1* | 12/2007 | Brown Elliott et al. ...... 345/102 |

FOREIGN PATENT DOCUMENTS

| JP | 2000-134631 A | 5/2000 |
| KR | 2003-0093763 A | 12/2003 |

* cited by examiner

*Primary Examiner* — James Hannett
(74) *Attorney, Agent, or Firm* — Sughrue Mion, PLLC

(57) ABSTRACT

An apparatus, a method, and a program for processing an image are provided. The apparatus includes: a determiner which determines an area corresponding to a white-saturation area included in a raw image based on raw data representing the raw image, wherein the raw image is obtained by photographing and is not processed; and a converter which selectively performs an image space frequency distribution conversion on a portion of the raw data that corresponds to the determined area corresponding to the white-saturation area. The converter reduces luminance changes of pixels which are not a preset reference pixel in the area corresponding to the white-saturation area.

4 Claims, 6 Drawing Sheets

SIZE OF COMPRESSED DATA
2 BITS + 2 BITS + 2 BITS + 2 BITS = 8 BITS

| PIXEL VALUE AFTER CONVERSION | DIFFERENCE VALUE | CODING VALUE |
|---|---|---|
| 3215 | | |
| 3215 | 0 | 2 BITS |
| 3215 | 0 | 2 BITS |
| 3215 | 0 | 2 BITS |
| 3215 | 0 | 2 BITS |

B ↙

SIZE OF COMPRESSED DATA
12 BITS + 11 BITS + 11 BITS + 12 BITS = 46 BITS

| PIXEL VALUE | DIFFERENCE VALUE | CODING VALUE |
|---|---|---|
| 4000 | | |
| 3500 | 500 | 12 BITS |
| 3600 | 300 | 11 BITS |
| 3500 | 300 | 11 BITS |
| 4000 | 500 | 12 BITS |

APPARATUS, METHOD, AND PROGRAM FOR PROCESSING IMAGE

CROSS-REFERENCE TO RELATED PATENT APPLICATIONS

This application claims the benefit of Japanese Patent Application No. 2012-0265772, filed on Dec. 4, 2012, in the Japanese Patent Office, and Korean Patent Application No. 10-2013-0069951, filed on Jun. 18, 2013, in the Korean Intellectual Property Office, the disclosures of which are incorporated herein in their entirety by reference.

BACKGROUND

1. Field

Apparatuses and methods consistent with exemplary embodiments relate to an apparatus, a method, and a program for processing an image.

2. Description of the Related Art

Gain of raw data is adjusted to perform white balance adjusting for adjusting a white balance of an image processed with respect to the raw data. A technique of the related art for performing white balance processing with respect to raw data is disclosed in Japanese Patent Publication No. 2011-155696.

SUMMARY

Recently there has been an increase of users who perform image processing with respect to raw data (hereinafter referred to as data representing a raw image that has been obtained through capturing and has not been processed), not through a photographing apparatus that has captured the image, but instead through a personal computer (PC) or the like that records raw data in a recording medium and performs image processing with respect to the recorded raw data.

Here, the raw data is data that is to undergo image processing, such as white balance processing, contrast adjusting, noise removing, or the like and thus generally has a large size. Therefore, if the raw data is efficiently compressed to reduce the size of the raw data, the number of images that may be recorded in a recording medium may be increased. As a result, the raw data may be efficiently compressed to improve convenience of a user.

Even if a photographing apparatus performs image processing with respect to the raw data, the photographing apparatus transmits raw data obtained from a photographing device to a memory such as a Synchronous Dynamic Random Access Memory (SDRAM) to record the raw data in the memory and performs image processing with respect to the raw data recorded in the memory.

Even if the photographing apparatus performs image processing with respect to the raw data as described above, the photographing apparatus may efficiently compress the raw data to reduce a size of the raw data in order to reduce power consumption occurring due to a data transmission. Therefore, if the photographing apparatus is driven by an internal power source such as a battery or the like, the photographing apparatus may reduce the size of the raw data to increase the amount of time that the internal power source may power the photographing apparatus.

Accordingly, it is important to efficiently compress the raw data because convenience of a user may be improved, and power consumption for a data transmission may be reduced.

In a technique of the related art described in Patent Document 1, white balance processing is performed with respect to raw data, and an image that has undergone white balance processing is compressed. However, the technique of the Patent Document 1 does not consider a further efficient compression of the raw data. Therefore, although the technique described in the Patent Document 1 is used, the raw data may be inefficiently compressed.

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provides an apparatus, a method, and a program for processing an image, by which raw data is further efficiently compressed.

According to an aspect of an exemplary embodiment, there is provided an apparatus for processing an image. The apparatus may include: a determiner which determines an area corresponding to a white-saturation area included in a raw image based on raw data representing the raw image, wherein the raw image is obtained by photographing and is not processed; and a converter which selectively performs an image space frequency distribution conversion on a portion of the raw data that corresponds to the determined area corresponding to the white-saturation area, wherein the converter reduces luminance changes of pixels which are not a preset reference pixel in the area corresponding to the white-saturation area.

According to the above-described aspect of the exemplary embodiment, unnecessary information may be reduced from the raw data, and thus the raw data may be further efficiently compressed.

The converter may set the luminance changes of pixels which are not the reference pixel in the area corresponding to the white-saturation area, to zero.

The determiner may determine the area corresponding to the white-saturation area according to a result of a comparison between a pixel value of the preset reference pixel and a predetermined threshold value and a result of a comparison between a value, which is obtained by multiplying pixel values of pixels that are not the preset reference pixel by white balance coefficients that respectively correspond to the pixels that are not the reference pixel, and the predetermined threshold value.

The apparatus may further include: a compression processor which performs image compression processing with respect to the portion of the raw data on which the image space frequency distribution conversion has been selectively been performed.

According to aspect of another exemplary embodiment, there is provided a method of processing an image. The method may include: determining an area corresponding to a white-saturation area included in a raw image based on raw data representing the raw image, wherein the raw image is obtained by photographing and is not processed; and selectively performing an image space frequency distribution conversion on a portion of the raw data that corresponds to the determined area corresponding to the white-saturation area. When performing the image space frequency distribution conversion, luminance changes of pixels which is not a preset reference pixel may be reduced in the area corresponding to the white-saturation area.

According to the above-described aspect of the exemplary embodiment, unnecessary information may be reduced from the raw data, and thus the raw data may be further efficiently compressed.

According to aspect of another exemplary embodiment, there is provided a non-transitory computer readable storage medium storing a program, which, when executed by a computer, performs a method of processing an image. The method may include: determining an area corresponding to a white-saturation area included in a raw image based on raw data representing the raw image, wherein the raw image is obtained by photographing and is not processed; and selectively performing an image space frequency distribution conversion on a portion of the raw data that corresponds to the determined area corresponding to the white-saturation area. When performing the image space frequency distribution conversion, luminance changes of pixels which are not a preset reference pixel may be reduced in the area corresponding to the white-saturation area.

According to the above-described aspect of the exemplary embodiment, unnecessary information may be reduced from the raw data, and thus the raw data may be further efficiently compressed.

BRIEF DESCRIPTION OF THE DRAWINGS

The above and other features and advantages will become more apparent by describing in detail exemplary embodiments with reference to the attached drawings in which:

FIG. 7 is a view illustrating results of image compression processing performed with respect to raw data that has selectively undergone an image space frequency distribution conversion according to operation processing of FIG. 6.

DETAILED DESCRIPTION OF EXEMPLARY EMBODIMENTS

Figure 1:
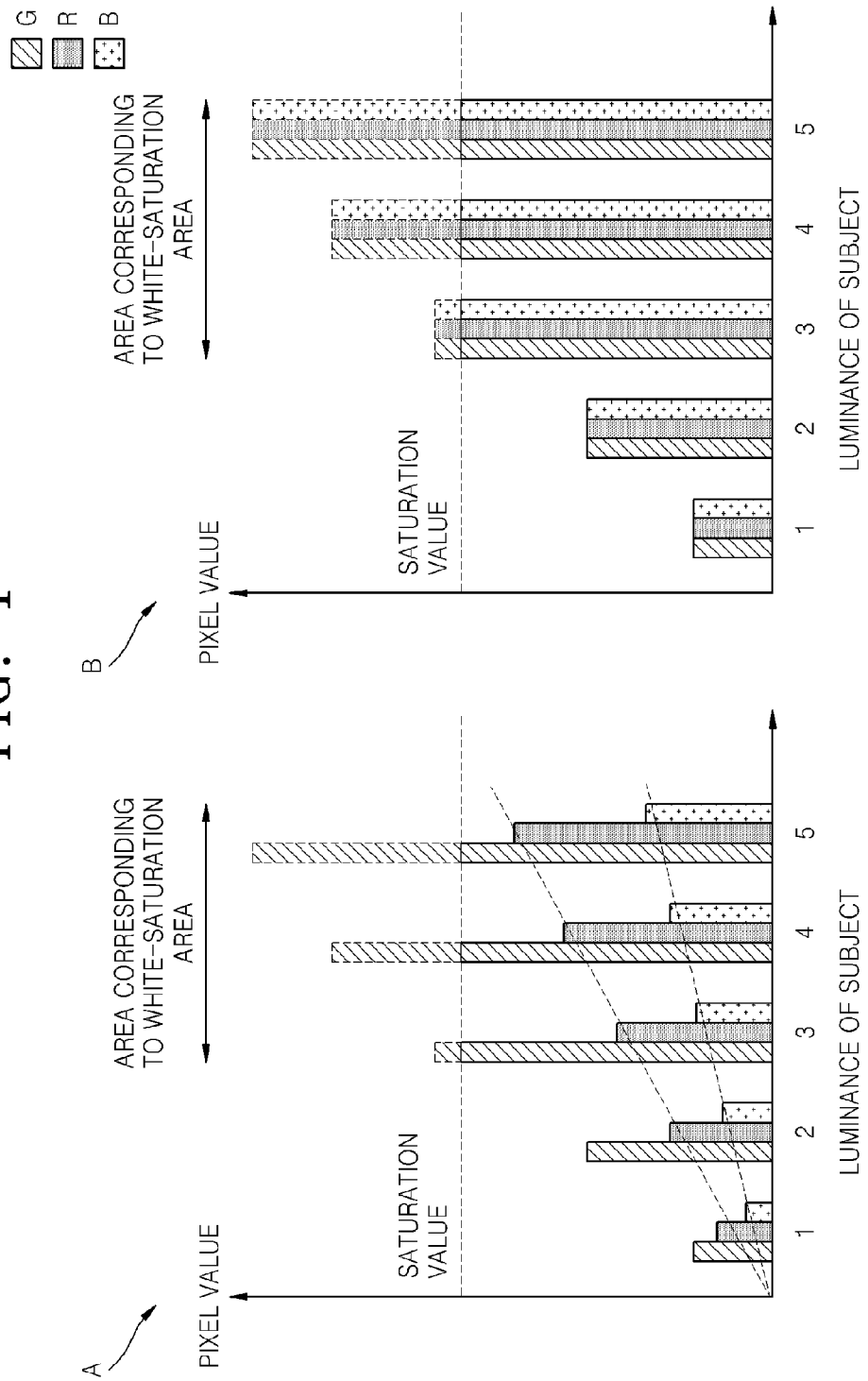
FIG. 1 is a view illustrating a problem occurring when an image compression technique of the related art is performed with respect to raw data of an image.

Certain exemplary embodiments will be described more fully with reference to the attached drawings.

In the following description, like drawing reference numerals are used for the same elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure exemplary embodiments with unnecessary detail.

As used herein, the term "and/or" includes any and all combinations of one or more of the associated listed items.

Hereinafter, raw data will be described as image data that includes red (R), green (G), and blue (B) pixels obtained by a photographing device or a color filter having a Baeyer arrangement. In addition, raw data that may be processed by an image processing method of an exemplary embodiment is not limited to the image data obtained by the photographing device having the Baeyer arrangement. In other words, the image processing method of the exemplary embodiments may be applied to various types of image data.

[1] Problem Occurring when an Image Compression Technique of the Related Art is Performed Before describing an image processing apparatus according to an exemplary embodiment that may perform an image processing method according to an exemplary embodiment, a problem that occurs when an image compression technique of the related art is performed with respect to raw data will be first described.

FIG. 1 is a view illustrating a problem that occurs when an image compression technique of the related art is performed with respect to raw data of an image. A of FIG. 1 illustrates a pixel value of raw data that has not undergone white balance processing, and B of FIG. 1 illustrates a pixel value of the raw data that has undergone white balance processing. Here, the horizontal axis of FIG. 1 denotes an intensity level (i.e., 1<2<3<4<5) of a light source, and the vertical axis of FIG. 1 denotes a pixel value. In FIG. 1, the raw data of an image indicate grayscales. Here, reference numeral 1 denotes luminance close to black, and reference numeral 5 denotes luminance close to white. A saturation value, illustrated in FIG. 1 by a dashed line, denotes an upper limit value of the number of bits of the raw data (e.g., if the number of bits is 8, the upper limit value is 256).

For example, as shown in A of FIG. 1, if the raw data of the image indicate the grayscales, a pixel value has a characteristic of "G>R>B." R, G, and B pixels are multiplied by gain coefficients to have the same value in consideration of the characteristic, thereby achieving white balance processing, as shown in B of FIG. 1.

An expressible range of a photographing device is limited, and as to the raw data on which white balance processing is to be performed, the G pixel is first saturated if the luminance of a subject is higher than a predetermined value, such as "3," "4," and "5" shown in A of FIG. 1.

If white balance processing is performed, the R, G, and B pixels are respectively multiplied by the gain coefficients (hereinafter referred to as white balance coefficients) for adjusting white balance. As a result, similar to "3," "4," and "5" shown in B of FIG. 1, the R, G, and B pixels are respectively saturated. Here, similar to "3," "4," and "5" shown in B of FIG. 1, an area in which R, G, and B pixels are respectively saturated after performing white balance processing is referred to as a white-saturation area.

In general, due to an image size, a user may enjoy an image indicated by image data that has undergone image processing, including white balance processing. Therefore, a luminance difference (i.e., an image space frequency component) between the R and G pixels may be regarded as unnecessary information (i.e., data) in an area (hereafter used as the same meaning as the white-saturation area) corresponding to the white-saturation area of the raw data (after white balance processing is performed).

However, the image compression of the related art performed with respect to raw data compresses the raw data along with this unnecessary information. Therefore, the image compression of the related art is inefficient.

[2] Image Processing Apparatus According to an Exemplary Embodiment

The image processing apparatus according to the exemplary embodiment determines an area corresponding to a white-saturation area included in a raw image based on raw data according to an image processing method according to an exemplary embodiment (i.e., Determination Processing). An example of this determination processing will be described later in further detail.

The image processing apparatus selectively performs an image space frequency distribution conversion of the raw data corresponding to the area corresponding to the determined white-saturation area (i.e., Conversion Processing). That is, the image processing apparatus according to the present exemplary embodiment reduces changes in luminances of pixels, except for preset reference pixels in the area corresponding to the white-saturation area.

Here, the reference pixels may be color pixels that are first saturated if luminance of a subject becomes higher than a predetermined value. For example, in FIG. 1, the G pixel may be the preset reference pixel according to the exemplary embodiment. In addition, the preset reference pixel according to the present exemplary embodiment is not limited to the G pixel. For example, the R or B pixel may be the reference pixel according to the type of light source. The reference pixel may be pre-set or may be set (or re-set) based on a user control or a detection result of the light source.

As described above, the image processing apparatus according to the present exemplary embodiment performs the determination processing and the conversion processing according to the image processing method of the present exemplary embodiment. Here, the image processing apparatus reduces a luminance change of a pixel that is not the reference pixel in the area corresponding to the white-saturation area in the conversion processing. Therefore, if the image processing apparatus performs image compression processing on the raw data that has undergone the conversion processing, the raw data from which the unnecessary information has been reduced may be compressed.

Therefore, the image processing apparatus may perform processing (i.e., the determination processing and the conversion processing) according to the image processing method of the exemplary embodiment to further efficiently compress the raw data.

In addition, the image compression processing performed with respect to the raw data according to the present exemplary embodiment may be performed by the image processing apparatus or an external apparatus that may perform image compression processing.

A structure of the image processing apparatus and the processing (i.e., the determination processing and the conversion processing) according to the image processing method will now be described in more detail.

For purposes of describing the structure of the image processing apparatus, a G pixel is set to a reference pixel, and R and B pixels are set to pixels that are not reference pixels. However, as described above, the reference pixel is not limited to the G pixel.

Figure 2:
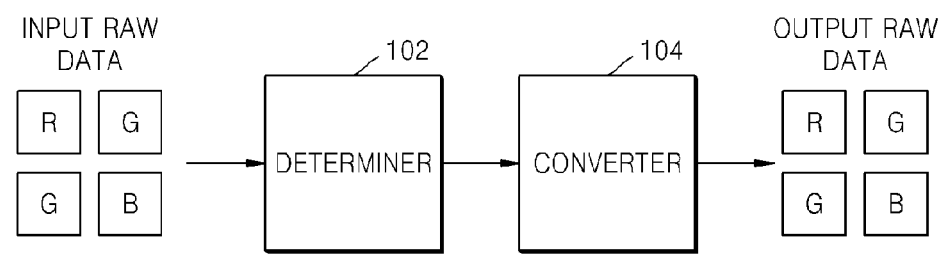
FIG. 2 is a block diagram illustrating a structure of an apparatus for processing an image according to an exemplary embodiment.

FIG. 2 is a block diagram illustrating a structure of an image processing apparatus 100 according to an exemplary embodiment. Referring to FIG. 2, the image processing apparatus 100 includes a determiner 102, and a converter 104.

Here, raw data that is to be processed by the image processing apparatus 100, i.e., raw data that has not undergone processing according to the image processing method of the exemplary embodiments, is illustrated as input raw data. Also, in FIG. 2, raw data that has been processed by the image processing apparatus 100, i.e., raw data that has undergone the processing according to the image processing method, is illustrated as output raw data.

The input raw data may be raw data that is transmitted from a photographing unit (that will be described later in further detail) or an external photographing apparatus. However, the raw data is not limited thereto. For example, the input raw data may be raw data that is recorded and read from a memory or an external recording medium of the external apparatus that is directly connected to the image processing apparatus or connected through a network.

The image processing apparatus 100 may include a controller (not shown), a read only memory (ROM) (not shown), a random access memory (RAM) (not shown), a memory (not shown), a user controller (not shown), a display (not shown) that displays various types of screens on a display screen, a communicator (not shown) that communicates with the external apparatus, a photographing unit (not shown), etc. Elements of the image processing apparatus 100 may be connected to one another through a bus that is a data transmission path.

Here, the controller includes a central processing unit (CPU) or various types of processing circuits to control an overall operation of the image processing apparatus 100. The controller may also operate as the determiner 102 and the converter 104 (or as either of the determiner 102 and the converter 104). Also, the determiner 102 and the converter 104 may be constituted as exclusive (or general-purpose) processing circuits that may realize processing of each unit.

The controller may perform processing, such as recording the output raw data in the memory, or compression processing that will be described later, with respect to the output raw data.

The ROM stores data for controlling a program or an operation parameter used by the controller. The RAM temporarily stores a program or the like that may be executed by the controller.

The memory is included in the image processing apparatus 100 and stores various types of data such as image data, an application, etc. The memory may be a magnetic recording medium, such as a hard disk or the like, or a nonvolatile memory, such as a flash memory or the like. The memory may be removable from the image processing apparatus 100.

The user controller may be a button, a direction key, or a combination thereof. The image processing apparatus 100 may be connected to a control input apparatus (e.g., a keyboard, a mouse, or the like) as an external apparatus of the image processing apparatus 100.

The display unit may be a liquid crystal display (LCD), an organic electro-luminescence display, or the like. The display unit may be a touch screen or the like and include the user control. The image processing apparatus 100 may be connected to a display apparatus (e.g., an external display or the like) as an external apparatus of the image processing apparatus 100 regardless of whether the image processing apparatus 100 includes the display unit.

The communicator is included in the image processing apparatus 100 and communicates with the external apparatus via a wire or wirelessly through a network (or directly). Here, the communicator may be a communication antenna, a radio frequency (RF) circuit (radio communication), an IEEE 802.11b port, a transmission and reception circuit (radio communication), a Local Area Network (LAN) terminal, a transmission and reception circuit (wired communication), or the like. The network according to the exemplary embodiment may be a wired network, such as a LAN, a Wide Area Network (WAN), or the like, a wireless network, such as a wireless LAN (WLAN), a Wireless WAN (WWAN) through a base station, the Internet using a communication protocol such as Transmission Control Protocol/Internet Protocol (TCP/IP), or the like.

The photographing unit captures a still image. If the image processing apparatus 100 includes the photographing unit, the image processing apparatus 100 may process raw data that is generated by capturing of the photographing unit.

The photographing unit according to the present exemplary embodiment may be a lens/imaging device. The lens/imaging device includes an image sensor that uses a plurality of imaging devices such as an optical system lens, a Complementary Metal Oxide Semiconductor (CMOS), or the like.

The determiner 102 performs the determination processing according to the exemplary embodiment and determines an area corresponding to a white-saturation area included in a raw image based on the input raw data.

Figure 3:
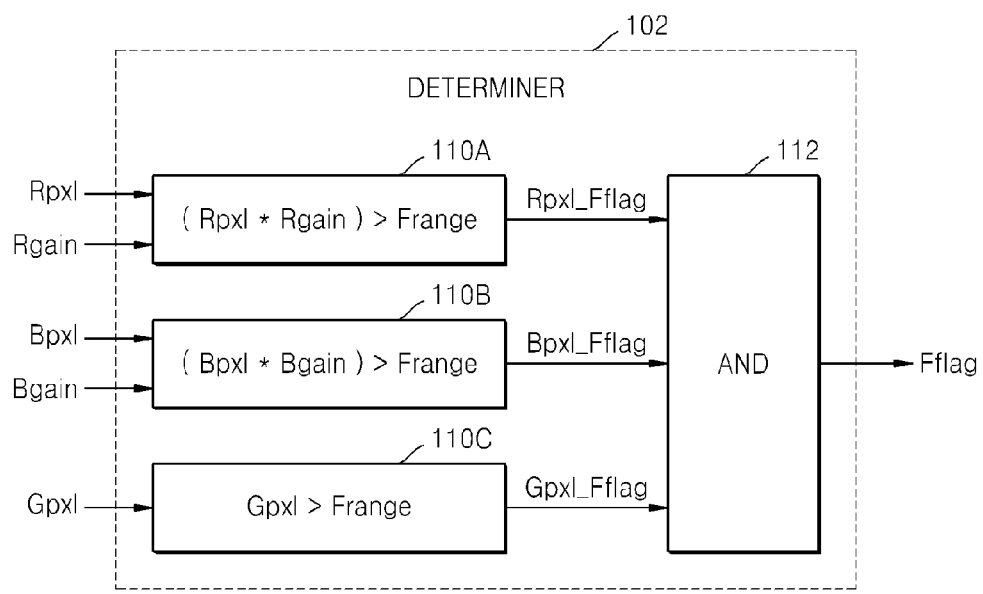
FIG. 3 is a block diagram illustrating a structure of the determiner of the apparatus of FIG. 2.

FIG. 3 is a block diagram illustrating a structure of the determiner 102 of the image processing apparatus 100 of FIG. 2 according to an exemplary embodiment. Referring to FIG. 3, the determiner 102 includes a first pixel determiner 110A, a second pixel determiner 110B, a third pixel determiner 110C, and a white-saturation area determiner 112.

A pixel value (hereinafter referred to as Rpxl or a pixel value Rpxl) corresponding to an R pixel of raw data, and a white balance coefficient (hereinafter referred to as Rgain or a white balance coefficient Rgain) corresponding to the R pixel are input into the first pixel determiner 110A. Here, the white balance coefficient Rgain is determined based on a result of raw data detected by the controller or a detection circuit. The first pixel determiner 110A compares a value, which is obtained by multiplying the pixel value Rpxl (a pixel value of a pixel that is not a reference pixel) and the white balance coefficient Rgain (a corresponding white balance coefficient) together, with a predetermined threshold value Frange.

Here, the predetermined threshold value Frange may be a preset fixed value or a variable value that may be changed by a user control or the like. In more detail, the predetermined threshold value Frange may be an expressible maximum value, for example, may be "4095" as an expression of 12 bits or "1023" as an expression of 10 bits.

The first pixel determiner 110A also transmits data indicating the comparison result to the white-saturation area determiner 112. Here, the data indicating the comparison result may be a flag Rpxl_Fflag indicating whether the value obtained by multiplying the pixel value Rpxl and the white balance coefficient Rgain is greater than the predetermined threshold value Frange (or whether the value is greater than or equal to the predetermined threshold value Frange, and hereinafter, these are the same). The data indicating the comparison result is not limited to the flag.

A pixel value (hereinafter referred to as Bpxl or a pixel value Bpxl) corresponding to a B pixel of the raw data and a white balance (hereinafter referred to as Bgain or a white balance coefficient Bgain) corresponding to the B pixel are input into the second pixel determiner 110B. Here, the white balance coefficient Bgain is determined based on a result of the raw data detected by the controller or the detection circuit.

The second pixel determiner 110B compares a value, which is obtained by multiplying the pixel value Bpxl (a pixel value of a pixel that is not a reference pixel) and the white balance coefficient Bgain (a corresponding white balance coefficient) together, with the predetermined threshold value Frange.

Like the first pixel determiner 110A, the second pixel determiner 110B transmits data indicating the comparison result to the white-saturation area determiner 112. Here, the data indicating the comparison result may be a flag Bpxl_Fflag indicating whether the value is greater than the predetermined threshold value Frange. The data indicating the comparison result is not limited to the flag.

A pixel value (hereinafter referred to as Gpxl or a pixel value Gpxl) corresponding to a G pixel of the raw data is input into the third pixel determiner 110C.

The third pixel determiner 110C compares the pixel value Gpxl (a pixel value of a reference pixel) with the predetermined threshold value Frange. Like the first pixel determiner 110A, the third pixel determiner 110C transmits the data indicating the comparison result to the white-saturation area determiner 112. Here, the data indicating the comparison result may be a flag Gpxl_Flag indicating whether the pixel value Gpxl is greater than the predetermined threshold value Frange. The data indicating the comparison result is not limited to the flag.

The white-saturation area determiner 112 determines an area corresponding to a white-saturation area in a raw image based on the data indicating the comparison results respectively transmitted from the first, second, and third pixel determiners 110A, 110B, and 110C.

That is, if all of the flags Rpxl-Flag, Bpxl-Flag, and Gpxl_Flag indicate that the product of Rpxl and Rgain, the product of Bpxl and Bgain, and Gpxl are each greater than the predetermined threshold value Frange, the white-saturation area determiner 112 determines a pixel corresponding to the flags as a pixel included in the area corresponding to the white-saturation area.

Processing performed by the white-saturation determiner 112 is not limited thereto. For example, if all of the flags Rpxl-Flag, Bpxl-Flag, and Gpxl_Flag satisfy Equation 1 below, the white-saturation area determiner 112 may determine a pixel corresponding to the flags as a pixel included in the area corresponding to the white-saturation area:

$$(Gpxl > Frange) \text{ and } (Rpxl*Rgain > Frange) \text{ and } (Bpxl*Bgain > Frange) \tag{1}$$

wherein Gpxl denotes a pixel value corresponding to a C pixel, Frange denotes a threshold value, Rpxl denotes a pixel value corresponding to an R pixel, Rgain denotes a white balance coefficient corresponding to the R pixel, Bpxl denotes a pixel value corresponding to a B pixel, and Bgain denotes a white balance coefficient corresponding to the B pixel.

The white-saturation area determiner 112 transmits data indicating the determination result of the area corresponding to the white-saturation area to the converter 104. Here, the data indicating the determination result may be a flag Fflag indicating the area corresponding to the white-saturation area. The data indicating the determination result is not limited to the flag.

The determiner 102 includes the first, second, and third pixel determiners 110A, 110B, and 110C and the white-saturation determiner 112 to determine the area corresponding to the white-saturation area based on the input raw data. The determiner 102 transmits the flag Fflag (an example of data indicating the determination result, hereinafter these are the same) to the converter 104.

An example of the structure of the image processing apparatus 100 will be described with reference to FIG. 2. The converter 104 performs conversion processing according to an exemplary embodiment and selectively performs an image space frequency distribution conversion with respect to raw data corresponding to a white-saturation area based on a transmitted flag Fflag. In more detail, the converter 104 reduces changes luminance of a pixel that is not a reference pixel located in the area corresponding to the white-saturation area.

Figure 4:
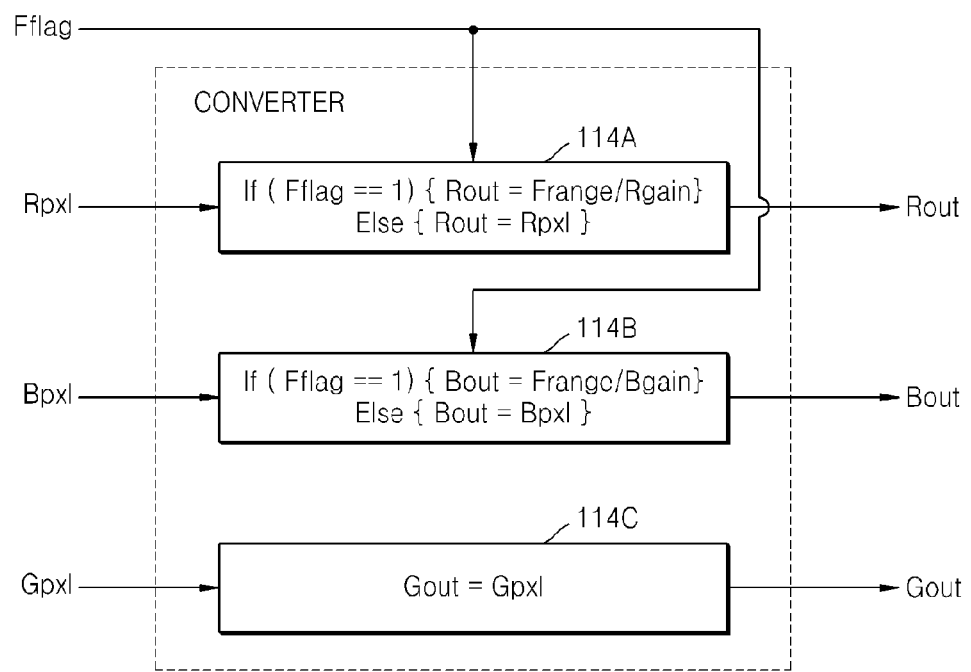
FIG. 4 is a block diagram illustrating a structure of the converter of the apparatus of FIG. 2.

FIG. 4 is a block diagram illustrating a structure of the converter 104 of the image processing apparatus 100 of FIG. 2, according to an exemplary embodiment.

Referring to FIG. 4, the converter 104 includes a first conversion processor 114A, a second conversion processor 114B, and a third conversion processor 114C.

The first conversion processor 114A selectively performs an image space frequency distribution conversion with respect to a pixel value Rpxl based on a flag Fflag. The first conversion processor 114A outputs a pixel value Rout that is obtained by selectively performing the image space frequency distribution conversion.

In more detail, if the flag Fflag indicates that a pixel is included in an area corresponding to a white-saturation area, the first conversion processor 114A performs the image space frequency distribution conversion. If the flag Fflag does not indicate that a pixel is included in the area corresponding to the white-saturation area, the first conversion processor 114A does not perform the image space frequency distribution conversion. For example, in the exemplary embodiment of FIG. 4, if the flag Fflag indicates "1," the flag Fflag indicates that a pixel is included in the area corresponding to the white saturation area.

Here, if the white-saturation area is changed into a non-white-saturation area, luminance changes are reduced the most. Therefore, the first conversion processor 114A performs an operation illustrated in Equation 2 below to reduce a luminance change of the pixel value Rpxl (a pixel value of a pixel that is not a reference pixel) to zero:

$$Rout = \frac{Frange}{Rgain} \quad (2)$$

wherein Rout denotes an output pixel value corresponding to an R pixel, Frange denotes the threshold value, and Rgain denotes a white balance coefficient corresponding to the R pixel.

The second conversion processor 114B performs an operation as described above, but with respect to a pixel value Bpxl.

The third conversion processor 114C outputs a value Gpxl of a reference pixel G without performing an operation as described above.

Figure 5:
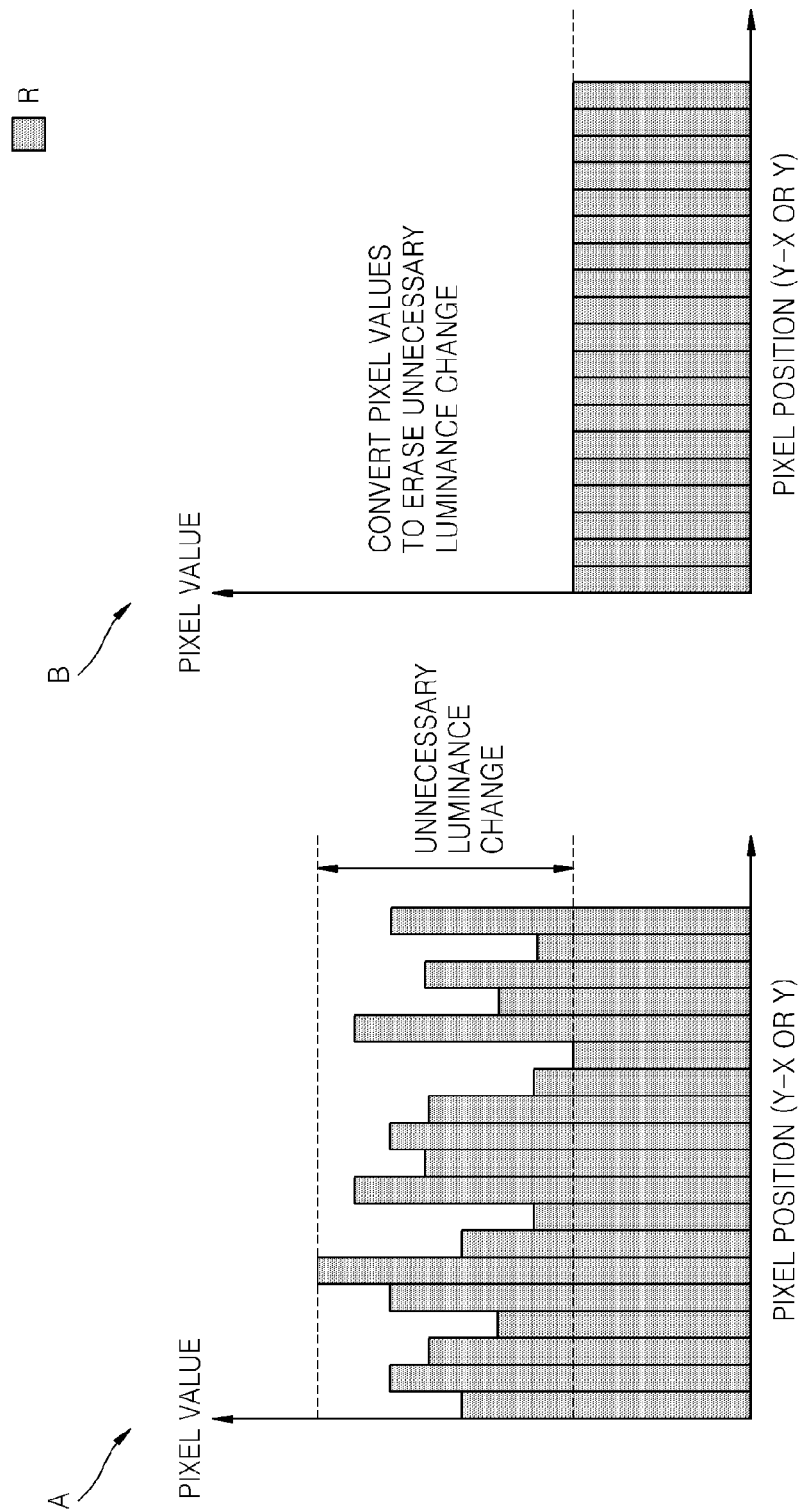
FIG. 5 is a view illustrating an operation of the conversion processors of the converter of FIG. 4.

FIG. 5 is a view illustrating operations of the first, second, and third conversion processors 114A, 114B, and 114C of the converter 104 of FIG. 4. In FIG. 5, reference character A denotes an example of a pixel value Rpxl that has not been processed by the first conversion processor 114A. Reference character B denotes an example of a pixel Rout that has been processed by the first conversion processor 114A.

For example, as shown in B of FIG. 5, the first conversion processor 114A converts a pixel value, which is determined as being included in an area corresponding to a white-saturation area, into a unique value. In other words, the first conversion processor 114A erases unnecessary luminance changes (information) from the area corresponding to the white-saturation area.

Therefore, the first conversion processor 114A may perform an operation of Equation 2 above to reduce the unnecessary information from input raw data.

Processing performed by the first conversion processor 114A is not limited to processing performed through the operation of Equation 2 above. The conversion processor 114A may perform an arbitrary operation that reduces luminance changes of a pixel value Rpxl (a pixel value of a pixel that is not a reference pixel).

The converter 104 according to an exemplary embodiment will be described with reference to FIG. 4. The second conversion processor 114B selectively performs an image space frequency distribution conversion with respect to a pixel Bpxl based on a transmitted flag Fflag. The second conversion processor 114B outputs a pixel value Bout that is obtained by selectively performing the image space frequency distribution conversion.

In more detail, like the first conversion processor 114A, if the flag Fflag indicates that a pixel is included in the area corresponding to the white-saturation area, the second conversion processor 114B performs the image space frequency distribution conversion. If the flag Fflag does not indicate that a pixel is included in the area corresponding to the white-saturation area, the second conversion processor 114B does not perform the image space frequency distribution conversion.

Here, if the white-saturation area is changed into a non-white saturation area, luminance changes are reduced the most. Therefore, the second conversion processor 114B performs an operation of Equation 3 below to set a luminance change of the pixel value Bpxl to zero:

$$Bout = \frac{Frange}{Bgain} \quad (3)$$

wherein Bout denotes an output pixel value corresponding to the B pixel, Frange denotes the threshold value, and Bgain denotes a white balance coefficient corresponding to the B pixel.

Processing performed by the second conversion processor 114B is not limited to processing performed through the operation of Equation 3 above. The second conversion processor 114B may perform an arbitrary operation that reduces luminance changes of the pixel value Bpxl (a pixel value of a pixel that is not a reference pixel).

The third conversion processor 114C outputs a pixel value Gpxl (a pixel value of a pixel that is not a reference pixel) as a pixel value Gout without considering the transmitted flag Fflag.

The converter 104 includes the first, second, and third conversion processors 114A, 114B, and 114C to selectively perform an image space frequency distribution conversion with respect to raw data corresponding to the area corresponding to the white-saturation area based on the transmitted flag Fflag.

As shown in FIG. 5, the converter 104 converts a pixel value, which is determined as being included in an area corresponding to a white-saturation area of a pixel that is not a reference pixel, into the unique value (if a luminance change is set to zero). In other words, the converter 104 erases unnecessary luminance changes from the area corresponding to the white-saturation area of the pixel that is not the reference pixel (if a luminance change is set to zero). Also, processing performed by the converter 104 is not limited to the above-described processing, and the converter 104 may reduce unnecessary luminance changes in the area corresponding to the white-saturation area of the pixel that is not the reference pixel.

Therefore, the converter 104 may perform conversion processing according to an exemplary embodiment to reduce the unnecessary information of input raw data. As a result, the converter 104 may perform the conversion processing to further efficiently compress raw data.

The image processing apparatus 100 includes the determiner 102 and the converter 104, as shown in FIG. 2, for determining an area corresponding to a white-saturation area and selectively performing an image space frequency distribution conversion with respect to raw data corresponding to the determined area.

An example of a processing operation of the image processing apparatus 100 will now be described.

Figure 6:
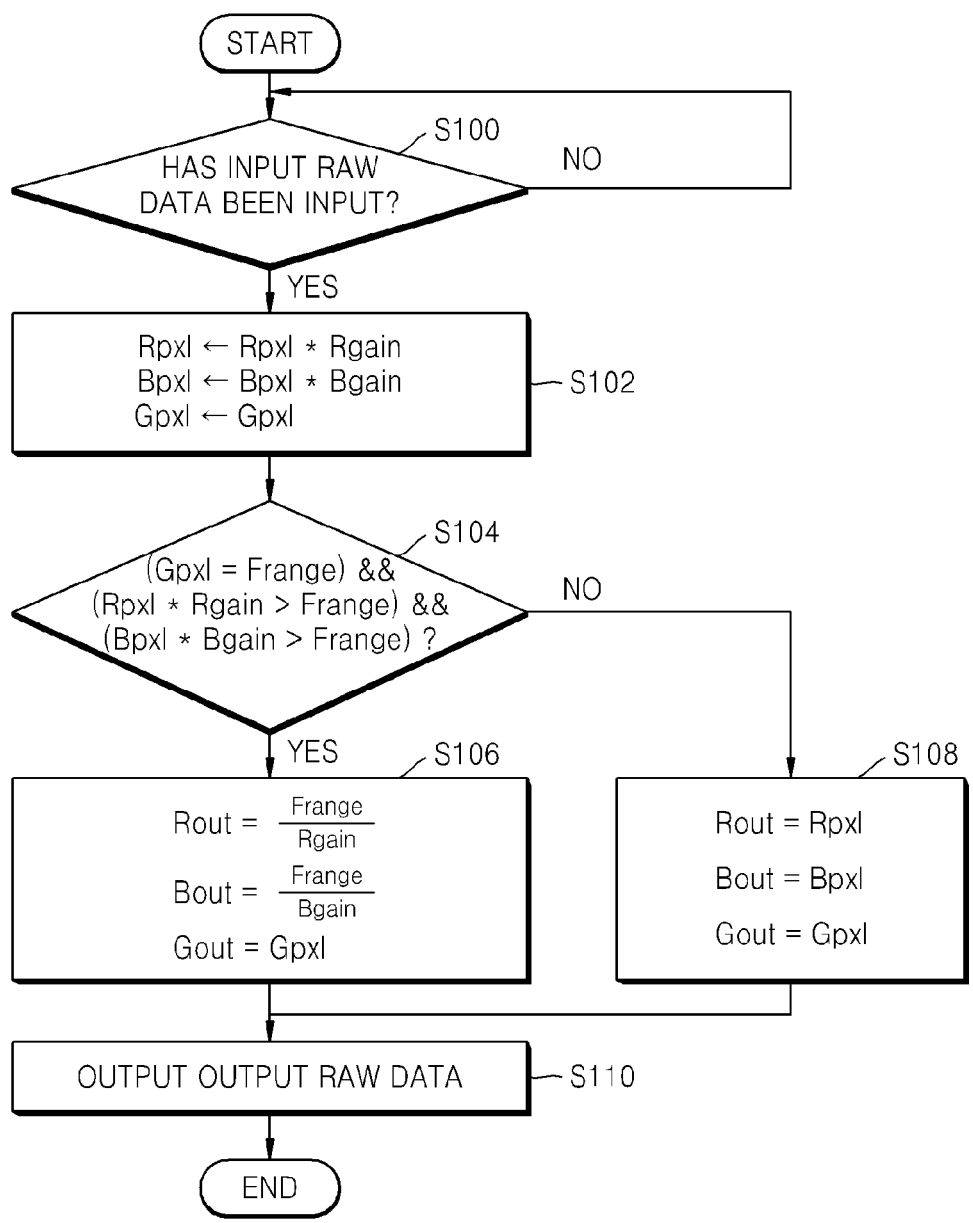
FIG. 6 is a flowchart illustrating a method of processing an image in the apparatus of FIG. 2, according to an exemplary embodiment.

FIG. 6 is a flowchart illustrating a processing operation of the image processing apparatus 100 of FIG. 2, according to an exemplary embodiment. Here, processing of operations S102 and S104 of FIG. 6 correspond to processing performed by the determiner 102, and processing of operations S106 and S108 of FIG. 6 correspond to processing performed by the converter 104. In the exemplary embodiment of FIG. 6, a G pixel is a reference pixel, and R and B pixels are pixels that are not reference pixels.

In operation S100, the image processing apparatus 100 determines whether input raw data has been input. If it is determined in operation S100 that the input raw data has not been input, the image processing apparatus 100 does not perform processing.

If it is determined in operation S100 that the input raw data has been input, the image processing apparatus 100 respectively multiplies pixel values Rpxl and Bpxl by corresponding white balance coefficients Rgain and Bgain, in operation S102. Here, processing of operation S102 corresponds to processing for generating a pixel value used to determine an area corresponding to a white-saturation area.

In operation S104, the image processing apparatus 100 determines the area corresponding to the white-saturation area by using a pixel value generated in operation S102 and a predetermined threshold value Frange.

Here, if the values in operation S104 satisfy a condition equation of Equation 1 above, the image processing apparatus 100 determines the area as corresponding to the white-saturation area.

Processing of operation S104 is not limited to processing using the condition equation. For example, as described above, the image processing apparatus 100 may determine an area corresponding to a white-saturation area by using flags Rpxl_F, Bpxl_F, and Gpxl_F.

If the image processing apparatus 100 determines the area as corresponding to the white-saturation area in operation S104, the image processing apparatus 100 performs an image space frequency distribution conversion in operation S106. The image processing apparatus 100 performs operations of Equations 2 and 3 above to perform the image space frequency distribution conversion.

If the image processing apparatus 100 determines the area as not corresponding to the white-saturation area in operation S104, the image processing apparatus 100 does not perform the image space frequency distribution conversion in operation S108.

If processing of operation S106 or S108 is performed, the image processing apparatus 100 outputs output raw data (i.e., raw data that has selectively undergone an image space frequency distribution conversion), in operation S110.

The image processing apparatus 100 may output the output raw data to a recording medium that may store the output raw data or may output the output raw data to a compression processor (that will be described later in further detail) or an external apparatus that may perform image compression processing with respect to the output raw data.

The image processing apparatus 100 includes the determiner 102 and the converter 104 and performs the processing of FIG. 6 to determine the area corresponding to the white-saturation area and selectively performs the image space frequency distribution conversion of raw data corresponding to the determined area.

As described above, the image processing apparatus 100 erases or reduces unnecessary luminance changes (information) from the area corresponding to the white-saturation area of a pixel that is not a reference pixel.

Therefore, the image processing apparatus 100 may reduce the unnecessary information of the input raw data to further efficiently compress raw data.

FIG. 7 is a view illustrating results of image compression processing performed with respect to raw data that has selectively undergone an image space frequency distribution conversion according to the operation processing of FIG. 6.

Here, A of FIG. 7 indicates data sizes of a compressed image that are obtained by selectively performing image compression processing with output raw data (i.e., raw data that has selectively undergone an image space frequency distribution conversion). B of FIG. 7 illustrates a comparison example with respect to A of FIG. 7. In detail, B of FIG. 7 indicates data sizes of a compressed image that are obtained by performing image compression processing of the related art with respect to raw data that has not undergone an image space frequency distribution conversion (i.e., raw data corresponding to input raw data).

FIG. 7 illustrates a pixel value of an R pixel or a pixel value of a B pixel in an area corresponding to a white-saturation area.

FIG. 7 illustrates data sizes of a compressed image if a difference value between a pixel and an adjacent pixel is calculated and coded by Huffman coding to compress output raw data.

In a technique of the related art, the difference value is calculated and coded irrespective of a white-saturation area. Therefore, as shown in B of FIG. 7, a data size of a coded image is 46 bits if the technique of the related art is used.

Output raw data according to an exemplary embodiment is raw data that has selectively undergone an image space frequency distribution conversion through the converter 104. As described above, the converter 104 reduces luminance changes of a pixel that is not a reference pixel, in an area of the pixel corresponding a determined white-saturation area. Therefore, difference values among pixel values, in the area corresponding to the white-saturation area, are reduced in output raw data transmitted from the converter 104. For example, if the converter 104 sets the luminance changes of the pixel that is not the reference pixel, in the area of the pixel corresponding to the white-saturation area, to zero, the difference values among pixel values, in the area corresponding to the white-saturation area, become zero as shown in A of FIG. 7.

Therefore, as shown in A of FIG. 7, a data size of a coded image, which is obtained by performing image compression processing with respect to output raw data (i.e., raw data that has selectively undergone an image space frequency distribution conversion), is 8 bits.

As shown from a comparison between the data size of the coded image shown in A of FIG. 7 and the data size of the coded image shown in B of FIG. 7, image compression processing may be performed with respect to output raw data to further improve compression efficiency of raw data. In other words, the image compression processing may be performed with respect to the output raw data (i.e., the raw data that has selectively undergone the image space frequency distribution conversion) to further reduce a size of compressed data.

Therefore, as shown in FIG. 7, the image processing apparatus 100 may perform processing (i.e., determination processing and conversion processing) according to an image processing method of an exemplary embodiment to further efficiently compress raw data.

The image processing apparatus 100 may perform the processing to further efficiently compress the raw data, thereby increasing the number of images that may be stored in recording mediums and the number of recordable images (i.e., the number of images represented by raw data). Therefore, the image processing apparatus 100 may perform the processing (i.e., the determination processing and the conversion processing) to improve convenience of a user.

Also, the image processing apparatus 100 may perform the processing (i.e., the determination processing and the conversion processing) to further efficiently compress raw data. Therefore, power consumption occurring due to a data transmission of the raw data may be decreased, and a bandwidth necessary for the data transmission of the raw data may be reduced.

The structure of the image processing apparatus 100 according to the exemplary embodiment is not limited to the structure of FIG. 2.

For example, the image processing apparatus 100 according to the exemplary embodiment may further include a compression processor (not shown) that performs image compression processing with respect to raw data that has selectively undergone an image space frequency distribution conversion through the converter 104.

The compression processor calculates a difference value between a pixel and an adjacent pixel to code an image by using Huffman coding in order to compress an image represented by output raw data. Here, the coding refers to processing by which information having a high appearance probability is converted into a short coding length of converted information, and by which information having a low appearance probability is converted into a long coding length of converted information. A difference value between a pixel and an adjacent pixel of a natural image is reduced, and thus a difference value "0" is converted into a minimum coding length of 2 bits. Also, if the difference value is increased (if an appearance probability is decreased), a converted coding length is increased.

The image compression processing performed by the compression processor is not limited to the coding processing performed by Huffman coding. The compression processor may compress an image indicated by output raw data by using an arbitrary coding method for compressing an image.

An image processing apparatus according to an exemplary embodiment has been described, but the exemplary embodiment is not limited to the above-described form. For example, the exemplary embodiment may be applied to various types of apparatuses that may process raw data like a photographing apparatus such as a digital camera or the like, a computer such as a PC, a server, or the like, a display apparatus such as a television receiver or the like, a communication apparatus such as a portable phone, a smart phone, or the like, an image/music player (or an image/music recording/producing apparatus), a game machine, etc. Also, the exemplary embodiment may also be applied to an image processing integrated circuit (IC) that may be included in an apparatus as described above.

A program for operating a computer as the image processing apparatus according to exemplary embodiments (e.g., a program for operating a computer as a determiner or a converter) may be executed in the computer to further efficiently compress raw data.

A program for operating the computer as a compression processor may be executed in the computer to further efficiently compress the raw data, thereby further reducing a size of compressed image data.

While exemplary embodiment have been particularly shown and described, it will be understood by those of ordinary skill in the art that various changes in form and details may be made therein without departing from the spirit and scope of the inventive concept as defined by the following claims.

For example, in the above description, a program (e.g., a computer program) for operating a computer as an image processing apparatus according to an exemplary embodiment is provided. However, according to exemplary embodiments, a recording medium that records the program may be provided together.

What is claimed is:

1. An apparatus for processing an image, comprising:
   a determiner configured to determine an area corresponding to a white-saturation area comprised in a raw image based on raw data representing the raw image, wherein the raw image is obtained by photographing and is not processed; and
   a converter configured to selectively perform an image space frequency distribution conversion on a portion of the raw data that corresponds to the determined area corresponding to the white-saturation area,
   wherein the converter is further configured to reduce luminance changes of pixels which are not a preset reference pixel in the area corresponding to the white-saturation area,
   wherein the determiner is further configured to determine the area corresponding to the white-saturation area according to a result of a comparison between a pixel value of the preset reference pixel and a predetermined threshold value and a result of a comparison between a value, which is obtained by multiplying pixel values of pixels that are not the preset reference pixel by white balance coefficients that respectively correspond to the pixels that are not the preset reference pixel, and the predetermined threshold value.

2. The apparatus of claim 1, further comprising:
   a compression processor configured to perform image compression processing with respect to the portion of the raw data on which the image space frequency distribution conversion has been selectively been performed.

3. An apparatus for processing an image, comprising:
   a determiner configured to determine an area corresponding to a white-saturation area comprised in a raw image based on raw data representing the raw image, wherein the raw image is obtained by photographing and is not processed; and
   a converter configured to selectively perform an image space frequency distribution conversion on a portion of the raw data that corresponds to the determined area corresponding to the white-saturation area,
   wherein the converter is further configured to reduce luminance changes of pixels which are not a preset reference pixel in the area corresponding to the white-saturation area,
   wherein the converter is further configured to set the luminance changes of the pixel which are not the reference pixel in the area corresponding to the white-saturation area, to zero, and
   wherein the determiner is further configured to determine the area corresponding to the white-saturation area according to a result of a comparison between a pixel value of the preset reference pixel and a predetermined threshold value and a result of a comparison between a value, which is obtained by multiplying pixel values of pixels that are not the preset reference pixel by white balance coefficients that respectively correspond to the pixels that are not the preset reference pixel, and the predetermined threshold value.

4. The apparatus of claim 3, further comprising:
a compression processor configured to perform image compression processing with respect to the portion of the raw data on which the image space frequency distribution conversion has been selectively been performed.

\* \* \* \* \*